United States Patent
Fitelson et al.

(10) Patent No.: US 7,580,431 B2
(45) Date of Patent: Aug. 25, 2009

(54) METHOD AND APPARATUS FOR HIGH POWER AMPLIFICATION IN MULTIMODE FIBERS

(75) Inventors: Michael M. Fitelson, Columbia, MD (US); Burke E. Nelson, Albuquerque, NM (US); Robert R. Rice, Simi Valley, CA (US); Sami A. Shakir, Albuquerque, NM (US)

(73) Assignee: Northrop Grumman Corporation, Los Angeles, CA (US)

( * ) Notice: Subject to any disclaimer, the term of this patent is extended or adjusted under 35 U.S.C. 154(b) by 582 days.

(21) Appl. No.: 10/922,925

(22) Filed: Aug. 23, 2004

(65) Prior Publication Data

US 2006/0045160 A1 Mar. 2, 2006

(51) Int. Cl.
*H01S 3/30* (2006.01)
(52) U.S. Cl. .............................. 372/6; 372/69
(58) Field of Classification Search .................. 372/69, 372/6
See application file for complete search history.

(56) References Cited

U.S. PATENT DOCUMENTS

| | | | |
|---|---|---|---|
| 5,818,630 A * | 10/1998 | Fermann et al. ........ | 359/341.31 |
| 6,310,715 B1 * | 10/2001 | Moore .................... | 359/334 |
| 7,233,712 B2 * | 6/2007 | Arellano ................. | 385/14 |
| 2005/0018950 A1 * | 1/2005 | Arellano ................. | 385/14 |
| 2005/0105854 A1 * | 5/2005 | Dong et al. ............. | 385/46 |

FOREIGN PATENT DOCUMENTS

EP 980122 A2 * 2/2000

OTHER PUBLICATIONS

US000001926H.*

* cited by examiner

*Primary Examiner*—Dung T Nguyen
(74) *Attorney, Agent, or Firm*—Andrews Kurth LLP

(57) ABSTRACT

An apparatus and method for high power amplification in a multimode fiber amplifier. The apparatus includes a diffraction limited low power laser, a multimode fiber amplifier, and a lens. The multimode fiber amplifier is coupled to the low power laser to amplify the low power laser output. The multimode fiber amplifier has a length that is set to a phase-matching length at which the transverse modes of the multimode fiber amplifier are in phase. The lens is coupled to the multimode fiber amplifier and outputs a kilowatt (KW)-level, diffraction-limited output beam from the multimode fiber amplifier.

23 Claims, 5 Drawing Sheets

METHOD AND APPARATUS FOR HIGH POWER AMPLIFICATION IN MULTIMODE FIBERS

BACKGROUND

There is considerable interest in high power solid state lasers both for military and industrial applications. Some progress has been achieved through several approaches including slab lasers and heat capacity lasers for bulk solid-state lasers, and coherent fiber laser arrays for fiber based laser systems. The major problem confronting methods employing bulk solid-state materials is heat management. Thermal gradients cause the laser beam to deteriorate in quality and the system efficiency to deteriorate due to high temperature's negative impact on the inversion process.

The major problem confronting phased-array fiber lasers is the complexity associated with phasing a large number of single mode fibers employed in fiber phasing, especially when the number of fibers are in the hundreds. Employing single-mode fibers in these fiber arrays is necessary due to beam quality requirements. However, power scaling in single-mode fibers has been limited to few hundred watts per fiber.

On the other hand, using a multimode fiber amplifier for high power solid state lasers requires achieving diffraction-limited outputs. In previous attempts at achieving diffraction-limited output from multimode fiber amplifiers, higher order mode suppression has been the theme. Adjusting fiber index and dopant distribution, as described in H. L. Offerhaus, N. G. Broderick, D. J. Richardson, R. Sammut, J. Caplen, and L. Dong, Opt. Lett. 23, 1683 (1988) and J. M. Sousa, and O. G. Okhotnikov, Appl. Phys. Lett. 74, 1528 (1999), cavity configuration, as described in U. Griebner, R. Koch, H. Schonnagel, and R. Grunwald, Opt. Lett. 21, 266 (1996) and U. Griebner, and H. Schonnagel, Opt. Lett. 24, 750 (1999), launch conditions of the seed beam, as described in M. E. Fermann, Opt. Lett. 23, 52 (1998) and I. Zawischa, K. Plamann, C. Fallnich, H. Welling, H. Zellmer, and A. Tunnermann, Opt. Lett. 24, 469 (1999), and coiling the fiber, as described in J. P. Koplow, D. A. Kliner, and L. Goldberg, Opt. Lett. 25, 442 (2000), have been employed with limited degrees of success. For example, in coiling the fiber, the fundamental mode suffers losses as well as the higher order modes, thus lowering the efficiency of the system.

SUMMARY

What are described are a method and apparatus for high power amplification in multimode fibers. The method and apparatus overcome the disadvantages described above. The method and apparatus may provide a high power, solid state laser that is relatively compact and efficient.

These and other advantages are achieved by and apparatus for high power amplification in multimode fibers. The apparatus includes a diffraction limited low power laser, a multimode fiber amplifier, and a lens. The multimode fiber amplifier is coupled to the low power laser to amplify the low power laser output. The multimode fiber amplifier has a length that is set to a phase-matching length at which the transverse modes of the multimode fiber amplifier are in phase. The lens is coupled to the multimode fiber amplifier and outputs a kilowatt (KW)-level, diffraction-limited output beam from the multimode fiber amplifier. The apparatus may be used as a laser in a number of applications. For example, a weapon or welding laser comprising the apparatus may be fabricated.

These and other advantages are achieved by a method for high power amplification in multimode fibers. The method includes coupling a diffraction limited low power single mode laser and a multimode fiber amplifier, determining a phase-matching length of the multimode fiber amplifier, and setting the length of the multimode fiber amplifier to the phase-matching length at which the transverse modes of the multimode fiber amplifier are in phase. The fiber length L may be adjusted using many different techniques, including applying an electric field to a piezoelectric cylinder around which the multimode fiber amplifier is wound, heating a segment of the multimode fiber amplifier, or causing the low power single mode laser to produce an output at a level sufficient to cause the refraction index of the multimode fiber amplifier to change so that a phase-matching condition is achieved.

DETAILED DESCRIPTION

In the apparatus and methods described herein, high power amplification is achieved by rendering modes of a multimode fiber amplifier "in phase." Rather than phasing an array of individual single mode fibers, as described above, the apparatus and methods described herein phase transverse modes of a single multimode fiber amplifier in a master-oscillator-power-amplifier (MOPA) configuration. This can be achieved by tailoring the length of the multimode fiber amplifier such that the phases of the transverse modes of the multimode fiber amplifier differ by an integer multiple of $2\pi$ at the multimode fiber amplifier's exit facet. When the phases of the transverse modes of the multimode fiber amplifier differ by integer multiples of $2\pi$, the transverse modes are in phase.

The transverse modes, when in phase at the output, are concentrated spatially. Accordingly, rendering the transverse modes in phase leads to the MOPA configuration outputting several tens of kilowatts of good beam quality cw (continuous wave) laser power. Such quality laser power renders this MOPA configuration an excellent weapon or candidate for industrial applications. For example, commercial low beam quality multimode Yb-doped fibers manufactured by a company called IPG and rated for about 10 kW, can be used as the multimode fiber amplifier in a MOPA configuration in an embodiment by removing one of the end mirrors and tailoring the length to coincide with the nearest phase matching length for the parameters of that particular fiber. Both graded index and step index multimode fibers have certain lengths, the "phase-matching lengths," where the modes of interest (i.e., the transverse modes) are in phase at the exit facet of the multimode fiber. At these phase-matching lengths, the beam quality is close to unity. This property is shown analytically for graded index fibers and numerically for the step-index fibers below.

Figure 1:
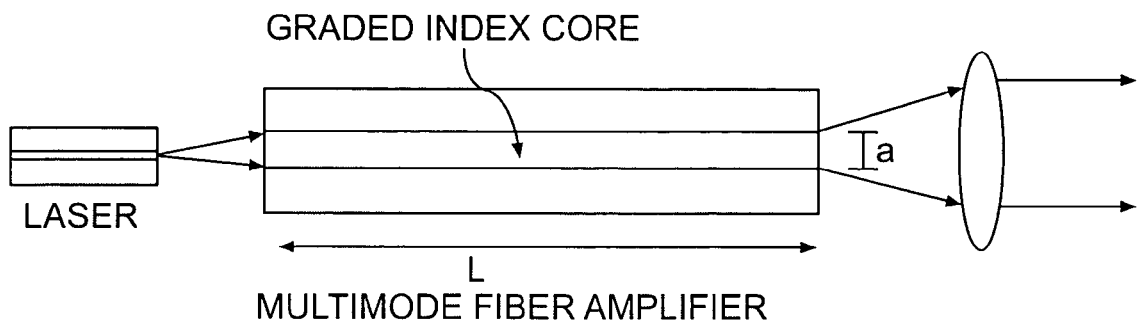
FIG. 1 is a block diagram illustrating an apparatus for high power amplification in a multimode fiber amplifier.

With reference now to FIG. 1, shown is an apparatus 10 for high power amplification in multimode fibers. The apparatus 10 may be a high power laser. The apparatus 10 is configured in a MOPA scheme that achieves diffraction limited amplification. The output of a diffraction limited master low power single mode fiber laser 12 is coupled into a multimode fiber amplifier 14. The low power single mode fiber laser 12 acts as the master oscillator in the MOPA scheme. The coupling may be achieved using known methods. The output of the multimode fiber amplifier 14 is coupled to a lens 16 that focuses the high power laser output. The length of the multimode fiber amplifier 12 is set to a phase-matching length. As described herein, phase-matching length(s) is the length(s) of a multimode fiber (in this case, multimode fiber amplifier 12) at which the modes of the fiber are in phase, achieving a beam quality close to unity. The phase-matching length(s) may be determined as described below.

The input field, $E_0(r,\phi)$, from the single mode fiber laser 12 into the multimode fiber amplifier 14 will decompose into the modes supported by the multimode fiber amplifier 14 as follows, $$E_O(r, \phi) = \sum_{l=0}^{l_{max}} \sum_{m=1}^{m_{max}(l)} c_{lm}\Psi_{lm}(r, \phi) \quad (1)$$

where r, $\phi$, are the radial and azimuth coordinates, and $\Psi_{lm}(r, \phi)$, and $c_{lm}$ are the multimode fiber amplifier 14 modes and decomposition constants, respectively. The indices l and m correspond to the azimuth and radial quantum number of the modes of the multimode fiber amplifier 14. The field inside the multimode fiber amplifier 14 can be represented by $$E(r, \phi, z, t) = \sum_{l=0}^{l_{max}} \sum_{m=1}^{m_{max}(l)} c_{lm}\Psi_{lm}(r, \phi) \cdot e^{g_{lm} \cdot z} \cdot e^{-i(\omega t + \beta_{lm} \cdot z)} \quad (2)$$

where $g_{lm}$ is the gain of the (l,m) mode, $\omega$ is the circular frequency of the master oscillator beam, $\beta_{lm}$ is the propagation vector of the (l,m) mode of the multimode fiber amplifier 14, and z, t, are the lateral and time variables, respectively.

At the exit facet of the multimode fiber amplifier 14 of length L, $$E_1(r, \phi, L, t) = \quad (3)$$
$$e^{-i(\omega t + \beta_{01} \cdot L)} \cdot e^{g_{01} \cdot L} \cdot \sum_{l=0}^{l_{max}} \sum_{m=1}^{m_{max}(l)} c_{lm}\Psi_{lm}(r, \phi) \cdot e^{(g_{lm}-g_{01})L} \cdot e^{-i\Delta\beta_{lm} \cdot L}$$

represents the output field from the multimode fiber amplifier 14. The length, L, of the multimode fiber amplifier 14 is chosen such that the phase-matching condition is satisfied (i.e., the transverse modes of the multimode fiber amplifier 14 are in phase). This phase-matching condition is defined as $$\Delta\beta_{lm} \cdot L = 2 \cdot \pi \cdot q_{lm} \quad (4)$$

where $q_{lm}$, is an integer which depends on l and m.

Substituting equation (4) into equation (3), equation (3) reduces to $$E_1(r, \phi) = E_o(r, \phi) \cdot e^{g \cdot L} \cdot e^{-i(\omega t + \beta_{01} \cdot L)} \quad (5)$$

for the phase-matching condition when the gain for the different modes are assumed to be approximately equal. In practice, the gains for the different modes are not equal, since the overlap of the different modes with the core 18 of the multimode fiber amplifier 14, where gain takes place, is different depending on each mode. However, the beam quality of the output of the apparatus 10 is dictated mostly by phase distortion rather than amplitude distortion. Simulations indicate that gain non-uniformity for the modes of the multimode fiber amplifier 14 has a minimal impact on output beam quality when the multimode fiber amplifier 14 is phase matched. The existence of such a phase-matching length in the case of a graded-index multimode fiber amplifier 14 is shown below. For a step-index multimode fiber amplifier 14, a numerical search for a length, which satisfies equation (4) as closely as possible, is described below.

Assuming a quadratic graded index multimode fiber amplifier 14 with a core radius a, and a refractive index defined by $$n(r) = \begin{vmatrix} n_1 \cdot \sqrt{1 - 2 \cdot \Delta \cdot \left(\frac{r}{a}\right)^2} & \text{for } r < a \\ n_1 \cdot \sqrt{1 - 2 \cdot \Delta} & \text{for } r > a \end{vmatrix} \quad (6)$$

one can show, using a WKB, (Wentzel-Kramers-Brillouin) approximation (see, e.g., "Optical Electronics," 3rd ed., A. Yariv, pg. 82) that the propagation constant of the fiber is given by $$\beta(q, m, n_1, \Delta, a, \lambda) := \frac{2 \cdot \pi \cdot n_1}{\lambda} \cdot \left[1 - \frac{2 \cdot \sqrt{2 \cdot \Delta}}{2 \cdot \pi \cdot N_1 \cdot a} \cdot \lambda \cdot (q + 2 \cdot m + 1)\right]^{\frac{1}{2}} \quad (7)$$

The phase-matching condition takes place periodically. In other words, the phase-matching condition occurs approximately every $\Delta L$ as given by the following equation:

$$\Delta L = \frac{2 \cdot \pi \cdot a}{\sqrt{2 \cdot \Delta}} \quad (8)$$

The validity of the above conclusions is shown by the following example. The example assumes that $n_1=1.5$, $\Delta=0.0005$, the core radius $a=100$ μm, and $\lambda=1.55$ μm. According to equation (8), the expected phase-matching period is 1.9869 cm. Accordingly, the phase-matching condition takes place every 1.9869 cm of the multimode fiber amplifier 14.

A numerical computation, which searches for a length satisfying the phase-matching condition of equation (4), analyzes the problem more rigorously. A phase-matching parameter $\Phi$ is calculated such that, $$\Phi = \sum_{q=0}^{q_{max}} \sum_{m=1}^{m_{max}(q)} (1 - \cos(\Delta\beta_{qm} \cdot L))^2. \quad (9)$$

Ideally, the phase-matching condition is achieved when $\Phi=0$. However, it may be that the mode constants are such that an exact phase-matching cannot be achieved. Accordingly, a minimum for $\Phi$ is sought.

Figure 2:
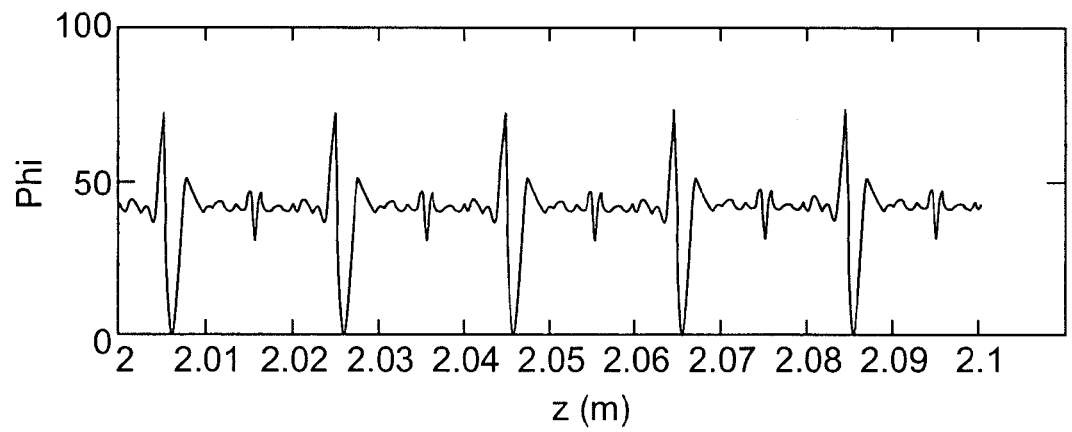
FIG. 2 is a graph illustrating a plot of a phase-matching parameter for a graded-index multimode fiber amplifier.

With reference now to FIG. 2, shown is a plot of $\Phi$ as a function of the multimode fiber amplifier 14 length between 2.0 m and 2.1 m. The period of the minima for $\Phi$ in the plot is about 1.9866 cm, compared to the expected value of 1.9869 cm as predicted by the calculations using equation (8) above. As can be seen from FIG. 2, there can be numerous phase-matching lengths of the multimode fiber amplifier 14. The length chosen should be the length that best fits the particular application in which the apparatus 10 is used (for example, a high-power laser comprising apparatus 10).

For a step-index multimode fiber amplifier 14, a numerical search can be performed to locate the fiber length(s) where the phase-matching condition is achieved as closely as possible. Normally, one can settle for a subset of the lowest order modes of the multimode fiber amplifier 14, since the higher order modes are lossy.

Figure 3:
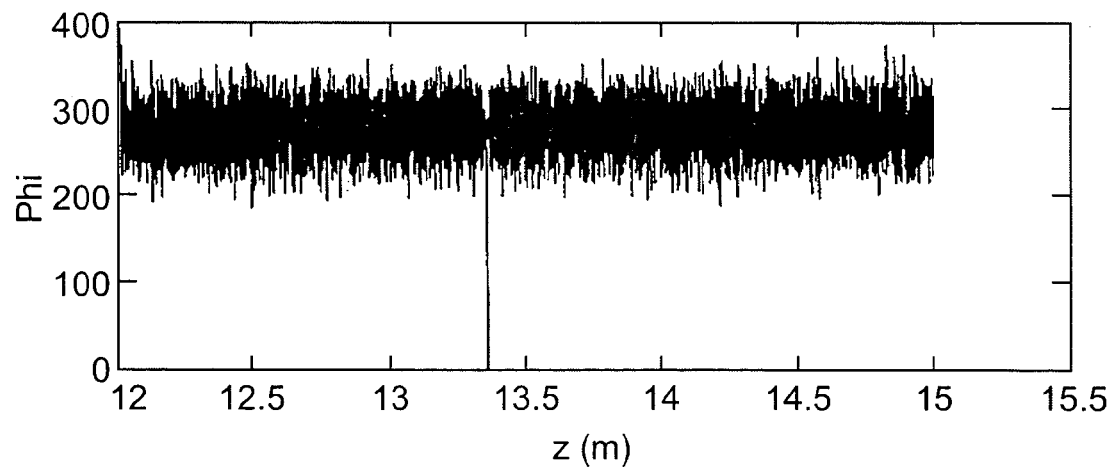
FIG. 3 is a graph illustrating a plot of a phase-matching parameter for a step-index multimode fiber amplifier.

With reference now to FIG. 3, shown is the result of a search for phase-matching lengths of a step-index multimode fiber amplifier 14 having a core radius of 100 μm and a $\Delta$ value of 0.001. The quantity plotted is $\Phi$ as defined in equation (9) above. As indicated in FIG. 3, there is one phase-matching length of 13.345333 m in the length range between 12 m and 15 m. The width of the phase-matching region is of the order of 500 μm, which is about the same as a corresponding graded index multimode fiber amplifier 14.

Figure 4B:
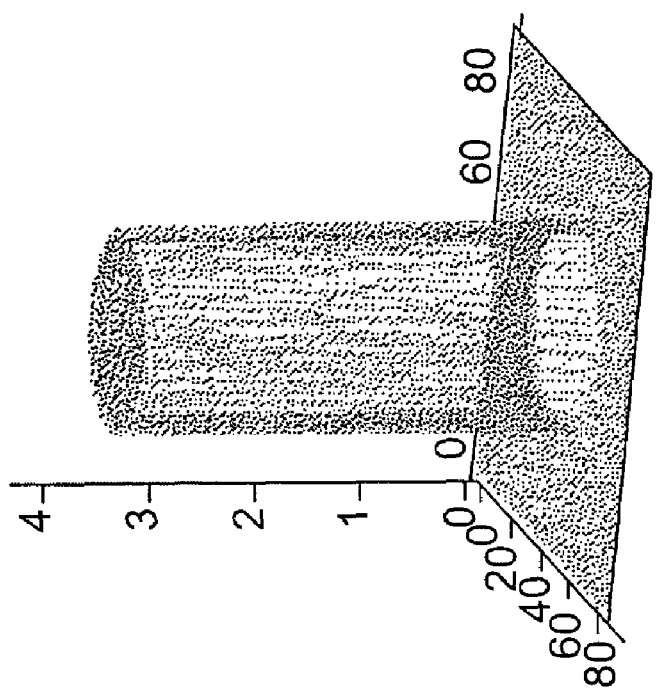
FIG. 4B is a graph illustrating phase of an output beam for a multimode fiber amplifier having a phase-matching length.
Figure 4A:
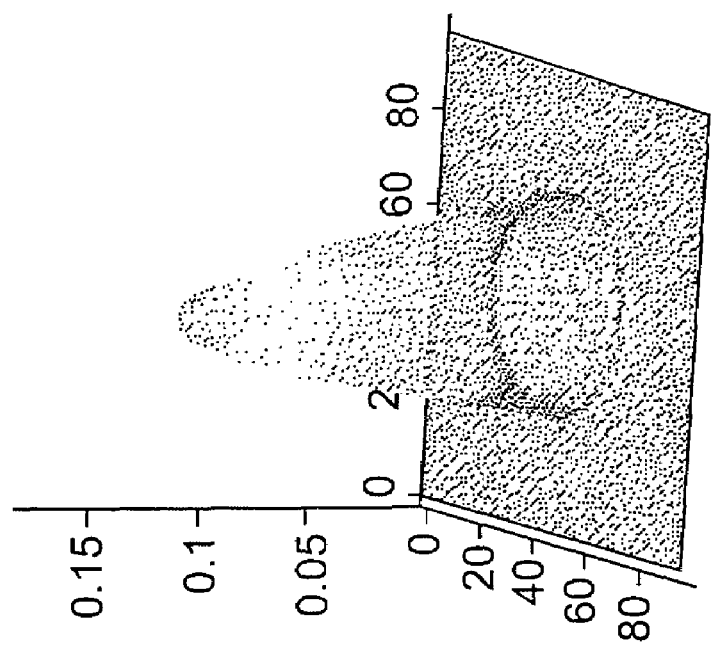
FIG. 4A is a graph illustrating intensity of an output beam for a multimode fiber amplifier having a phase-matching length.

With reference now to FIGS. 4A and 4B, shown is the amplified output beam of the apparatus 10 when the length of the multimode fiber amplifier 14 is set at the phase matching length shown in FIG. 3. FIG. 4A illustrates the intensity of the output beam and FIG. 4B illustrates the phase of the output beam. As shown in FIG. 4A, the output beam is a clean, focused beam. As shown in FIG. 4B, the phase of the amplified output beam is uniform. The uniform phase of the amplified output beam leads to a diffraction-limited far-field.

The sensitivity to length variation and length control is relatively low. The range over which the phase is basically uniform (~the width of the phase-matching region) is about 500 μm. This shows the sensitivity to length variation is not on the order of wavelengths but rather on the order of hundreds of wavelength. Consequently, the sensitivity is well within the abilities of one skill in the art to control the length of the multimode fiber amplifier 14.

There are several ways to tune and control the length of the multimode fiber amplifier 14. The simplest way is to use a piezoelectric cylinder around which the multimode fiber amplifier 14 is coiled. An electric field applied to the cylinder causes the multimode fiber amplifier 14 to stretch in length. By coiling the multimode fiber amplifier 14 around a cylinder, the entire apparatus 10 can be kept relatively compact. As such, the apparatus 10 can be incorporated into devices (e.g., a weapon) that can be easily carried by individuals or mounted on vehicles. Another method is to control the temperature of a small segment of the multimode fiber amplifier 14; as the temperature of the small segment rises, the small segment stretches to the appropriate length. Controlling the temperature may utilize a feedback system that controls the temperature based on a feedback input of the multimode fiber amplifier 14 output.

A third method is to take advantage of the Kerr nonlinear dependence of the refractive index of the multimode fiber amplifier 14 material. Per the Kerr nonlinear dependence, the low power single mode laser beam power causes the refractive index to change. At a certain power level, the optical refractive index will be such that phase-matching is achieved. This can be seen from equation (9) above, because the $\Delta\beta_{qm}$ values are power dependent in the product of $\Delta\beta_{qm}L$. Accordingly, the "phase-matching length" can be achieved without actually physically changing the length of the multimode fiber amplifier 14. In other words, the phase-matching length will be the current length of the multimode fiber amplifier 14 when the beam power level is set to the appropriate level to cause the refractive index to change so that phase-matching is achieved. Other techniques for tuning and controlling the length of the multimode fiber amplifier 14 may also be used. For example, any technique that directly controls the length or that creates an equivalent affect (e.g., controlling the index of refraction) may be used. It may not be practical to simply cut the fiber to the phase matching length, since some adjustment would probably be needed to account for environmental effects.

Figure 5:
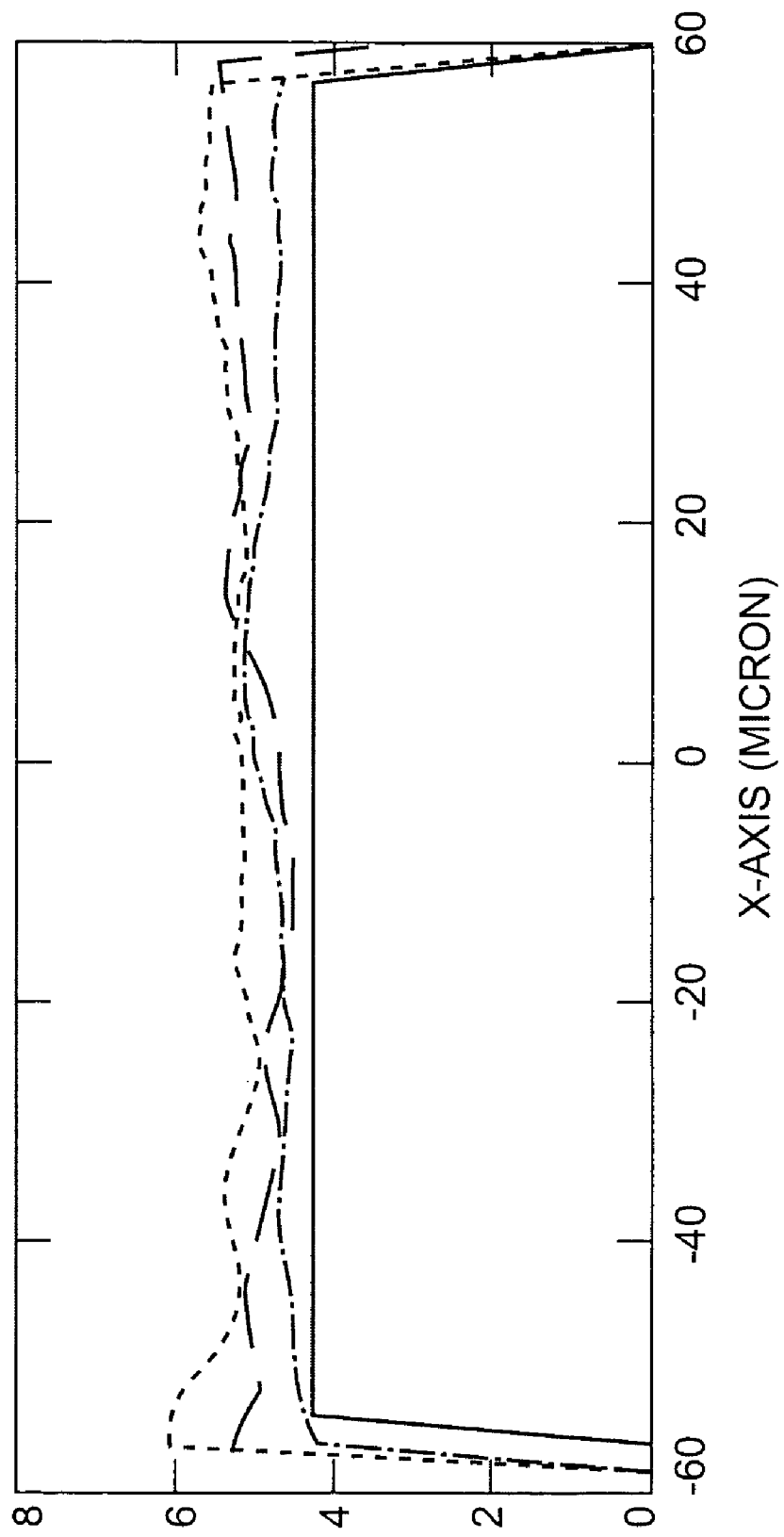
FIG. 5 is a graph illustrating an output beam phase front for different multimode fiber amplifier lengths including a phase-matching length.
Figure 6:
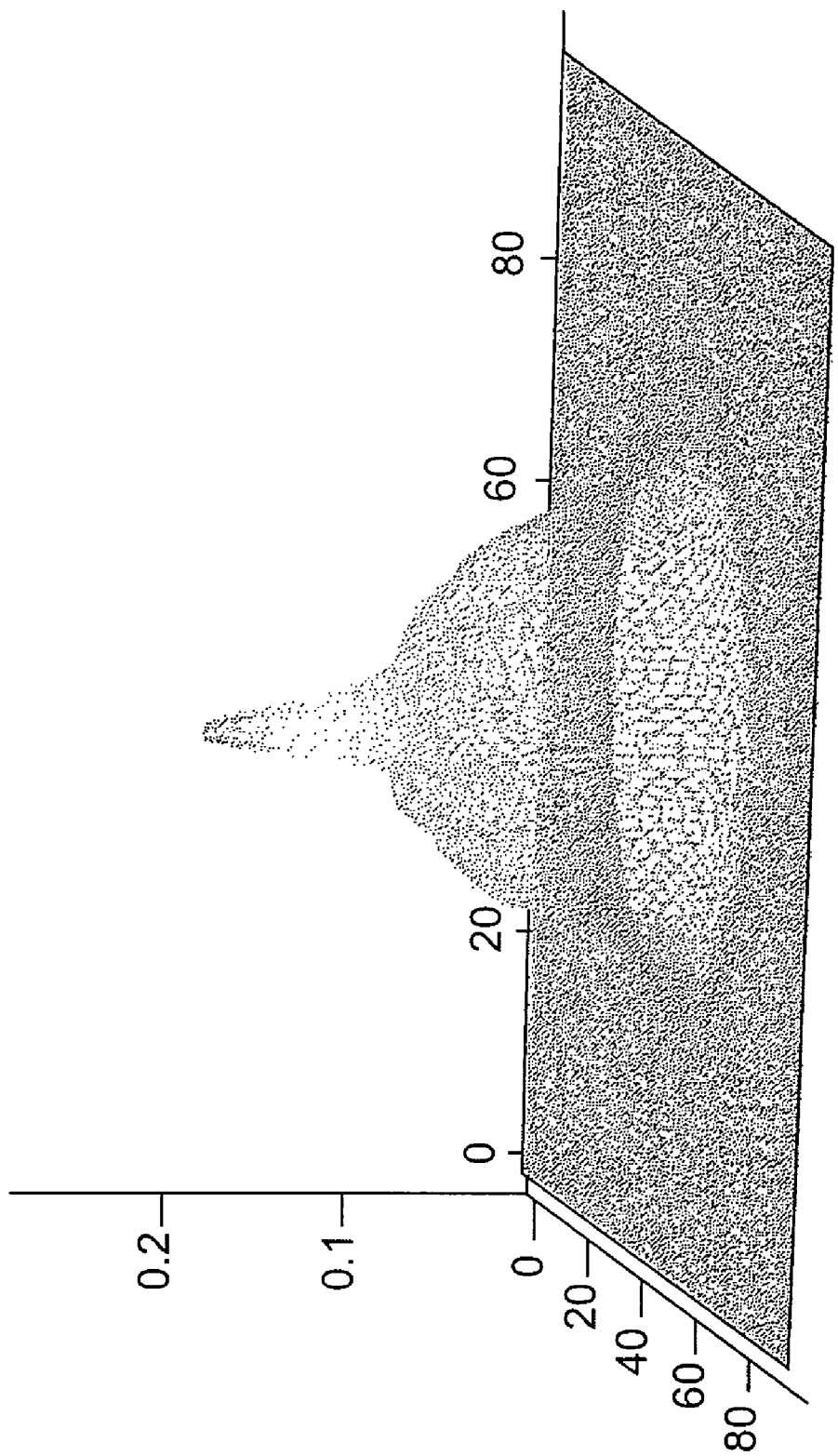
FIG. 6 is a graph illustrating an intensity profile a the phase-matching length of FIG. 5.

In a more realistic scenario where the defects in the multimode fiber amplifier 14 and possible fiber bending may cause coupling among the modes of the multimode fiber amplifier 14, the phase-matching is still preserved. With reference now to FIG. 5, shown graph illustrating the result of simulating a multimode fiber amplifier 14 where the modes are coupled in a random fashion. The graph shows the phase fronts for a number of fiber lengths. The solid curve represents the phase-matching case with a length of 13.345333 m. The dotted, dashed, and dashed-dotted curves correspond to 13.304834 m, 13.314834 m, and 13.324834 m lengths, respectively. As illustrated by FIG. 5, there is a uniform phase front for the phase-matching length. The uniform phase front suggests a diffraction limited output beam. FIG. 6 is a graph illustrating the corresponding intensity profile at the phase-matching length of FIG. 5 (13.345333 m). As also shown in FIG. 4A above, the output beam for a multimode fiber amplifier 14 set at phase-matching length is clean and focused.

Figure 7:
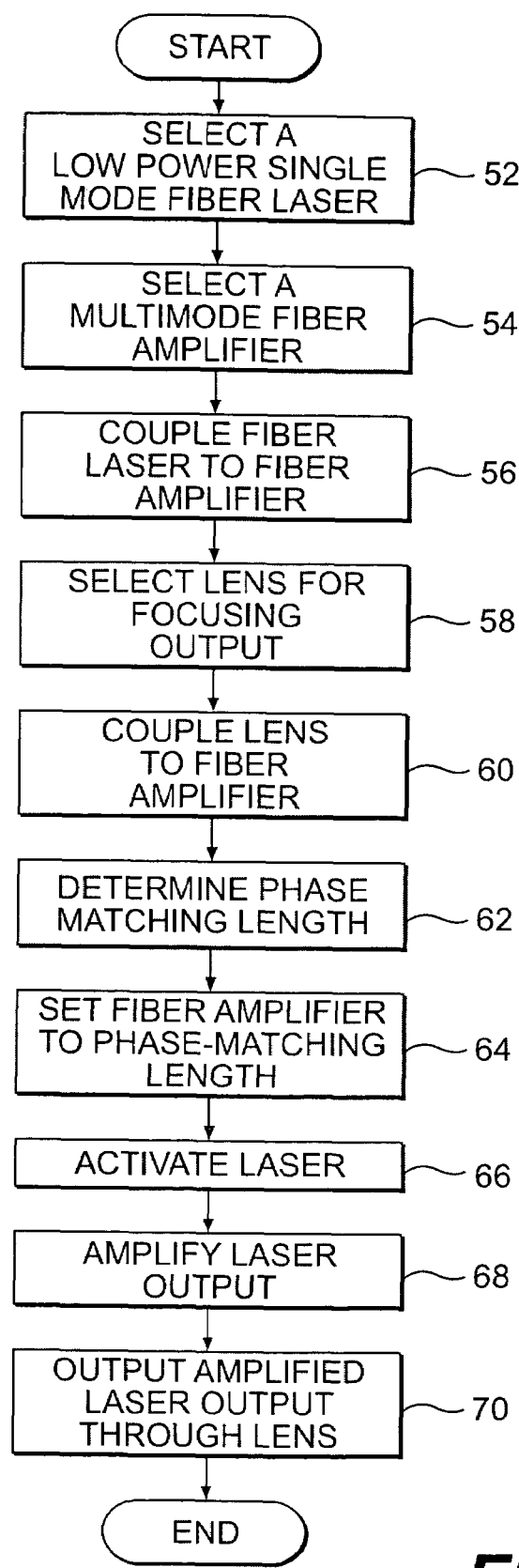
FIG. 7 is a flowchart illustrating a method for high power amplification in a multimode fiber amplifier.

FIG. 7 illustrates a method 50 for high power amplification in multimode fibers. The method 50 includes selecting a low power single mode fiber laser 12, block 52. The low power single mode fiber laser is diffraction limited. A multimode fiber amplifier 14 is selected, block 54. Virtually any multimode fiber may be used as the multimode fiber amplifier 14. The multimode fiber amplifier 14 may be any graded or step index of refraction fiber. The multimode fiber amplifier 14 may be doped with virtually any dopant, including, Yb, Er, Er/Yb, etc. Likewise, the multimode fiber amplifier 14 may be made from virtually any multimode fiber material. The multimode fiber amplifier 14 should be a quality fiber rated for sufficient high power for the chosen application.

The low power single mode fiber laser 12 is coupled to the multimode fiber amplifier 14, block 56. The coupling may be achieved through known methods (e.g., a tapered coupler spliced in position). A lens 16 for focusing the output of the multimode fiber amplifier 14 is selected, block 58. The lens 16 is coupled to the multimode fiber amplifier 14 output, block 60.

The phase-matching length(s) of the multimode fiber amplifier 14 is determined, block 62. The phase-matching length(s) may be determined as described above or using other methods. The length of the multimode fiber amplifier 14 is set to a phase-matching length, block 64. As described above, the phase-matching length may be set by applying an electric field to a piezoelectric cylinder around which the multimode fiber amplifier 14 is coiled. The electric field causes the multimode fiber amplifier 14 to stretch in length. By controlling the electric field, the length of the multimode fiber amplifier 14 can be controlled and set to the phase-matching length. Likewise, a small segment of the multimode fiber amplifier 14 can be heated or cooled to increase or decrease the length of the multimode fiber amplifier until the length is set to the phase-matching length. Alternatively, the Kerr nonlinear dependence of the refractive index of the multimode fiber amplifier 14 material can be utilized to set the phase-matching length. The beam power from the low power single mode fiber laser 12 can be controlled until the changing refractive index causes a phase-matching condition to be achieved for the current length of the multimode fiber amplifier 14. Other methods for controlling the length of the multimode fiber amplifier 14 may also be used.

The low power single mode laser 12 may be activated, block 66. The output beam of the low power single mode laser 12 is amplified by the multimode fiber amplifier 14, block 68, and output through the lens 16, block 70. The final output may be in the multiple kilowatt (e.g., 5-10 KW) or tens of kilowatts range. Multiple apparatus 10 and multimode fiber amplifiers 14 may be combined to get even greater outputs.

As described herein, the apparatus and method for high power amplification in a multimode fiber amplifier provide a clean, focused, quality high power laser output beam. Such a beam is quite useful in both industrial and military applications. Consequently, the apparatus 10 may be used as a high power solid state laser in a number of applications, including military and industrial applications. For example, the apparatus 10 may be used as a battlefield weapon, e.g., as a short-range, anti-personal weapon, anti-vehicle weapon, or anti-missile weapon. Such a laser could be used against an infrared (IR) seeker on a long-range missile. The laser could illuminate the IR seeker with a 5-10 KW, 0.8 to 2μ beam that would burn out the IR seeker. Alternatively, the apparatus 10 could provide such a coherent output beam for welding in industrial applications. As described herein, these benefits can be achieved simply by controlling the multimode fiber amplifier length or otherwise providing phase-matching conditions. A diffraction-limited output of a multimode fiber amplifier is achieved without higher order mode suppression. Consequently, a simple, compact and efficient solution to providing high power lasers is provided.

The foregoing description provides illustration and description, but is not intended to be exhaustive or to limit the invention to the embodiments disclosed. Modifications and variations are possible consistent with the above teachings or may be acquired from practice of the embodiments disclosed. Therefore, it is noted that the scope is defined by the claims and their equivalents.

The invention claimed is:

1. An apparatus for high power amplification in multimode fibers comprising:
    a diffraction limited low power laser;
    a multimode fiber amplifier, coupled to the low power laser to amplify the low power laser output, wherein the multimode fiber amplifier has a length that is substantially set to a phase-matching length at which the transverse modes of the multimode fiber amplifier are in phase, wherein the phase-matching length is chosen as the phase-matching length best fitting an intended application of the apparatus; and
    a lens, coupled to the multimode fiber amplifier, wherein a kilowatt (KW)-level, diffraction-limited output beam from the multimode fiber amplifier is output by the lens.

2. The apparatus of claim 1 wherein the diffraction limited low power laser is a single mode laser.

3. The apparatus of claim 1 wherein the apparatus is configured in a master-oscillator-power-amplifier (MOPA) configuration.

4. The apparatus of claim 3 wherein the low power laser is the master-oscillator in the MOPA configuration.

5. The apparatus of claim 1 wherein the output beam is coherent and focused.

6. The apparatus of claim 1 wherein the output beam has a power in the range of 5-10 KW.

7. The apparatus of claim 1, further comprising a piezoelectric cylinder around which the multimode fiber amplifier is wound.

8. The apparatus of claim 7, wherein an electric field is applied to the piezoelectric cylinder to set the length of the multimode fiber amplifier to the phase-matching length.

9. The apparatus of claim 1, further comprising a heater that controls temperature of a segment of the multimode fiber amplifier to set the length of the multimode fiber amplifier to the phase-matching length.

10. The apparatus of claim 1 wherein the multimode fiber amplifier is a graded-index multimode fiber amplifier.

11. The apparatus of claim 1 wherein the multimode fiber amplifier is a step-index multimode fiber amplifier.

12. A laser comprising the apparatus of claim 1.

13. A weapon comprising the apparatus of claim 1.

14. The weapon of claim 13 wherein the weapon is mounted on a vehicle.

15. The weapon of claim 13 wherein the weapon is capable of being held by an individual.

16. A welding laser comprising the apparatus of claim 1.

17. A method for high power amplification in multimode fibers comprising:
    coupling a diffraction limited low power single mode laser and a multimode fiber amplifier;
    determining a phase-matching length of the multimode fiber amplifier; and
    setting the length of the multimode fiber amplifier substantially to the phase-matching length at which the transverse modes of the multimode fiber amplifier are in phase, wherein the phase-matching length of the multimode fiber amplifier is determined as the phase-matching length best fitting an intended application of the multimode fiber amplifier.

18. The method of claim 17 further comprising:
    coupling a lens to the output of the multimode fiber amplifier.

19. The method of claim 17 further comprising:
    providing the multimode fiber amplifier wound around a piezoelectric cylinder.

20. The method of claim 19 wherein the setting step includes applying an electric field to the piezoelectric cylinder in order to increase the length of the multimode fiber amplifier.

21. The method of claim 17 wherein the setting step includes heating a segment of the multimode fiber amplifier in order to increase the length of the multimode fiber amplifier.

22. The method of claim 17 wherein the setting step includes increasing the low power single mode laser output beam power until the diffraction index of the multimode fiber amplifier changes enough to achieve a phase-matching condition at which the transverse modes of the multimode fiber amplifier are in phase.

23. The method of claim 17 further comprising activating the low power single mode laser so that the multimode fiber amplifier amplifies the output of the low power single mode laser and produces a kilowatt (KW)-level, diffraction-limited output.

* * * * *